US00RE35899E

United States Patent [19]

Cirone

[11] E

Patent Number: Re. 35,899

[45] Reissued Date of Patent: *Sep. 22, 1998

[54] NEOPRENE IRON COVERS

[75] Inventor: Dominick Cirone, 5441 E. Angela Dr., Scottsdale, Ariz. 85254

[73] Assignee: Dominick Cirone, Scottsdale, Ariz.

[ * ] Notice: The portion of the term of this patent subsequent to Jul. 25, 2011, has been disclaimed.

[21] Appl. No.: 408,779

[22] Filed: Mar. 23, 1995

Related U.S. Patent Documents

Reissue of:

[64] Patent No.: 5,195,568
Issued: Mar. 23, 1993
Appl. No.: 826,478
Filed: Jan. 24, 1992

U.S. Applications:

[63] Continuation of Ser. No. 735,915, Jul. 25, 1991, Pat. No. 5,105,863.

[51] Int. Cl.[6] ..... A63B 57/00

[52] U.S. Cl. ..... 150/160; 206/315.2; 206/315.4

[58] Field of Search ..... 150/159, 160; 206/315.2, 315.4

[56] References Cited

U.S. PATENT DOCUMENTS

| | | | |
|---|---|---|---|
| D. 191,315 | 9/1961 | Damiani et al. | D21/221 |
| D. 268,943 | 5/1983 | Miller . | |
| D. 273,968 | 5/1984 | Masai et al. . | |
| D. 295,544 | 5/1988 | Rice . | |
| D. 301,047 | 5/1989 | Pace . | |
| D. 312,289 | 11/1990 | Pace . | |
| D. 330,401 | 10/1992 | Harris, Jr. . | |
| 2,115,307 | 4/1938 | Kneeter | 150/160 |
| 2,417,336 | 3/1947 | Whitehead | 150/160 |
| 3,072,167 | 1/1963 | Banas | 150/160 |
| 3,255,794 | 6/1966 | Morse | 150/160 |
| 3,426,815 | 2/1969 | Ashlin et al. | 150/160 |
| 3,478,799 | 11/1969 | Hoyt, Jr. | 150/160 |
| 3,593,769 | 7/1971 | Spears | 150/160 |
| 3,727,659 | 4/1973 | Shuford . | |
| 3,754,587 | 8/1973 | Rainieri . | |
| 3,821,976 | 7/1974 | Smith et al. . | |
| 3,977,451 | 8/1976 | Duba | 150/159 X |
| 4,119,129 | 10/1978 | Freiberg | 150/160 |
| 4,368,768 | 1/1983 | Cunko, Jr. . | |
| 4,378,832 | 4/1983 | Thompson . | |
| 4,453,632 | 6/1984 | Clower . | |
| 4,800,119 | 1/1989 | Kolar . | |
| 4,898,222 | 2/1990 | Gaffney . | |
| 4,971,126 | 11/1990 | Borenstein | 206/315.4 |
| 5,005,624 | 4/1991 | Sung | 150/160 |
| 5,105,863 | 4/1992 | Cirone | 150/160 |
| 5,109,578 | 5/1992 | Cox . | |
| 5,117,884 | 6/1992 | Diener et al. . | |
| 5,133,395 | 7/1992 | Moore | 150/160 |
| 5,195,568 | 3/1993 | Cirone | 150/160 |
| 5,299,611 | 4/1994 | Cirone | 150/160 |

FOREIGN PATENT DOCUMENTS

| | | | |
|---|---|---|---|
| 261329 | 5/1965 | Australia | 206/315.2 |
| 3-165785 | 7/1991 | Japan . | |
| 1 360 058 | 7/1974 | United Kingdom . | |
| 1360058 | 7/1974 | United Kingdom | 206/315.2 |
| 1 397 252 | 1/1975 | United Kingdom . | |
| 1397252 | 6/1975 | United Kingdom . | |
| 2 133 700 | 8/1984 | United Kingdom . | |
| 2133700 | 8/1984 | United Kingdom | 150/160 |
| 2 233 239 | 1/1991 | United Kingdom . | |
| 2233239 | 1/1991 | United Kingdom | 150/160 |

*Primary Examiner*—Sue A. Weaver
*Attorney, Agent, or Firm*—Hunton & Williams

[57] ABSTRACT

A golf club cover or set of golf club covers for iron golf clubs formed of an elastic, rubber material such as neoprene is disclosed. A set of covers where each of the covers is of the same size and such that a snug fit with any of the irons of a set of golf clubs is ensured is also disclosed.

15 Claims, 2 Drawing Sheets

NEOPRENE IRON COVERS

Matter enclosed in heavy brackets [ ] appears in the original patent but forms no part of this reissue specification; matter printed in italics indicates the additions made by reissue.

FIELD OF THE INVENTION

This application is a continuation of application Ser. No. 07/735,915, filed Jul. 25, 1991, U.S. Pat. No. 5,015,863.

BACKGROUND OF THE INVENTION

It is well known to provide protective covers for the striking heads of golf clubs, particularly for "irons" to prevent damage to or by the club head. Such damage may occur, for example, by the clubs scratching or banging together. However, while various types of iron covers are known, there is a need for an improved iron cover due to the drawbacks and disadvantages of the known iron covers as discussed below.

For example, in British Patent No. 1,397,252 issued to Hallam, one type of known golf iron cover is disclosed. This type of cover comprises a pouch made of leather or leather grained PVC secured together by stitching and having a opening for the introduction of an iron head. A flap having a fastener (e.g., a fastener such as the type sold under the trademark VELCRO) so that the flap can be folded back around the heel of the head and shaft of the iron and across the pouch to secure the cover to the iron. The need for a flap to secure the cover to the iron is undesirable in that it is inconvenient to use. Specifically, in order to ensure that the cover does not fall off the iron, the user must remember to secure the flap. Even if the flap is secured by the user it may accidentally become unsecured enabling the cover to accidentally fall off. Additionally, when the user desires to use the iron, the flap must be detached before the cover can be removed.

U.S. Pat. No. 3,593,769 issued to Spears, also discloses a golf club iron cover which requires a fastening means to secure the cover to the club. In this patent, a tab is provided which wraps around the portion of the club which adjoins the shaft. This structure is undesirable for reasons similar to those stated with respect to Hallam.

U.S. Pat. No. 4,426,815 issued to Ashlin et al., discloses a golf club cover having a casing made of a layered material comprising woven nylon as an outer material and expanded vinyl as an inner material. While this type of cover avoids an additional flap or tab as used in Hallam and Spears, this cover nevertheless requires a fastening means. This cover uses a fastener, (e.g. a fastener such as the type sold under the trademark VELCRO) to close the opening to secure the cover to the club. British Patent No. 2,133,700 issued to Harrison, discloses a similar type of cover. While Ashlin and Harrison may be an improvement over the covers requiring an additional flap or tab, they still require a securing means which, if accidentally unfastened, can enable the cover to fall off and become lost. Additionally, this type of cover requires additional effort by the user in covering and uncovering the clubs each time a club is used.

U.S. Pat. No. 3,478,799 issued to Hoyt, Jr., discloses a one-piece slip-over cover having no fastening means and which is made from plastic (e.g. PVC or polyethylene). This overcomes the drawback of using a fastener. However, with these types of covers, the cover is shaped to fit a particular type of club. Since the various irons of a set of golf clubs have different sizes, a particular cover can only be used with a particular club. Moreover, the use of plastic for a head cover is disadvantageous. During particularly warm weather the cover expands and can accidentally slip off of the club. During cold weather, plastic has a tendency to become brittle and crack, especially if impacted by other clubs. Therefore, the use of plastic as a material for iron covers is undesirable.

U.S. Pat. No. 4,971,126 issued to Borenstein, also discloses a plastic golf club cover and suffers from similar drawbacks as those mentioned above with respect to the Hoyt patent. Additionally, the Hoyt and Borenstein patents both require openings or grooves to enable the iron to be inserted into the cover due to the rigidity of the plastic. This is also a drawback in that it enables water or other substances to contact the club head. Therefore, a secure, water-tight covering of the head is not provided by these covers.

In view of the foregoing, it is readily apparent that the prior art iron covers have various drawbacks which are obviously undesirable.

SUMMARY OF THE INVENTION

In view of the foregoing, it is an object of the present invention to overcome these and other drawbacks of the prior art.

Specifically, it is one object of the present invention to provide a flexible golf club cover that avoids the use of plastic or vinyl material to prevent breakage of the cover or accidental disengagement of the cover and club.

It is a further object of the present invention to provide a golf club cover which is water resistant and which effectively covers the club to prevent moisture or other undesirable objects from contacting the club when covered.

It is a further object of the present invention to provide a cover which is very flexible and easy to use.

It is a further object of the present invention to provide a golf club cover which ensures that the cover will not accidentally slip off the club and which avoids the need for fastening or closure members.

It is further object of the present invention to provide a golf club cover which can be used to cover any of the irons contained in a set of golf club irons and which adapts its shape upon insertion of the iron to securely cover the iron.

DESCRIPTION OF THE PREFERRED EMBODIMENTS

Figure 1:
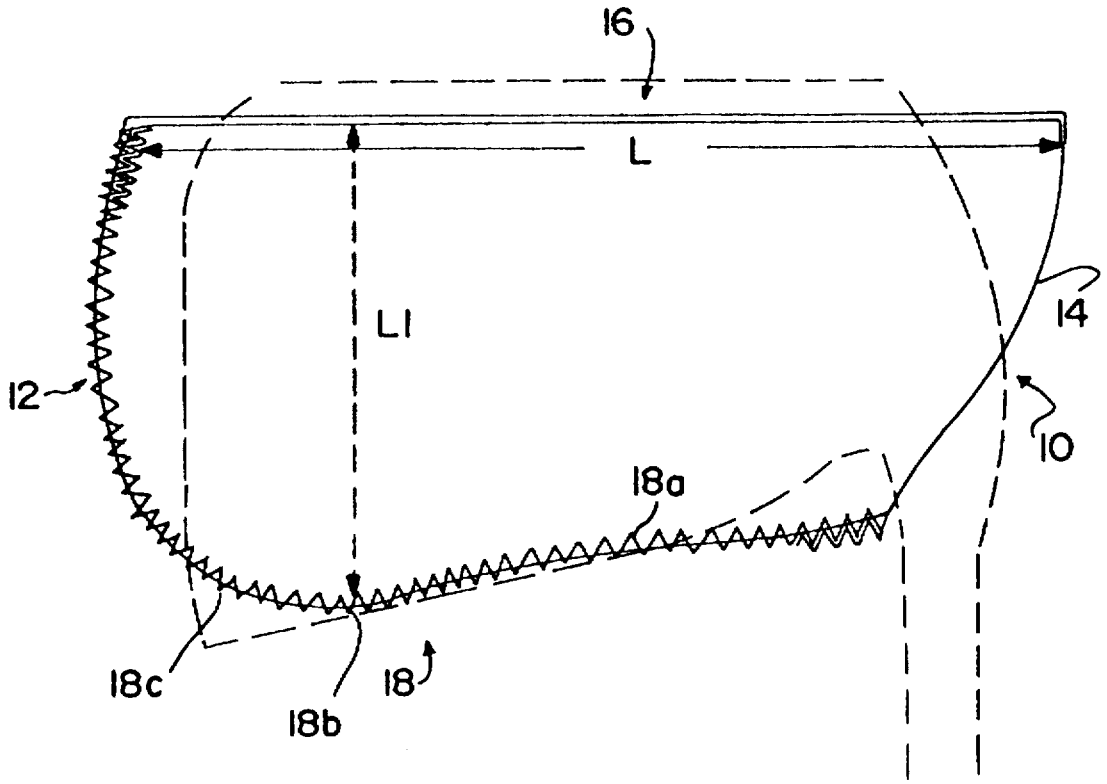
FIG. 1 is a plan view of an improved golf club cover according to the present invention.
Figure 2:
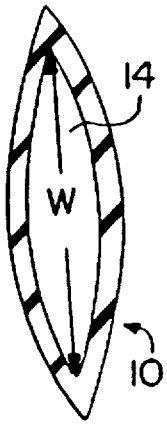
FIG. 2 is a partial sectional view of the golf club cover of FIG. 1.

Referring to FIG. 1, a golf club cover according to the present invention is shown. For ease of reference, the golf club cover will be referred to as having an open end 10 and a closed end 12. The open end has an opening 14 through which the club head may be inserted.

Figure 3:
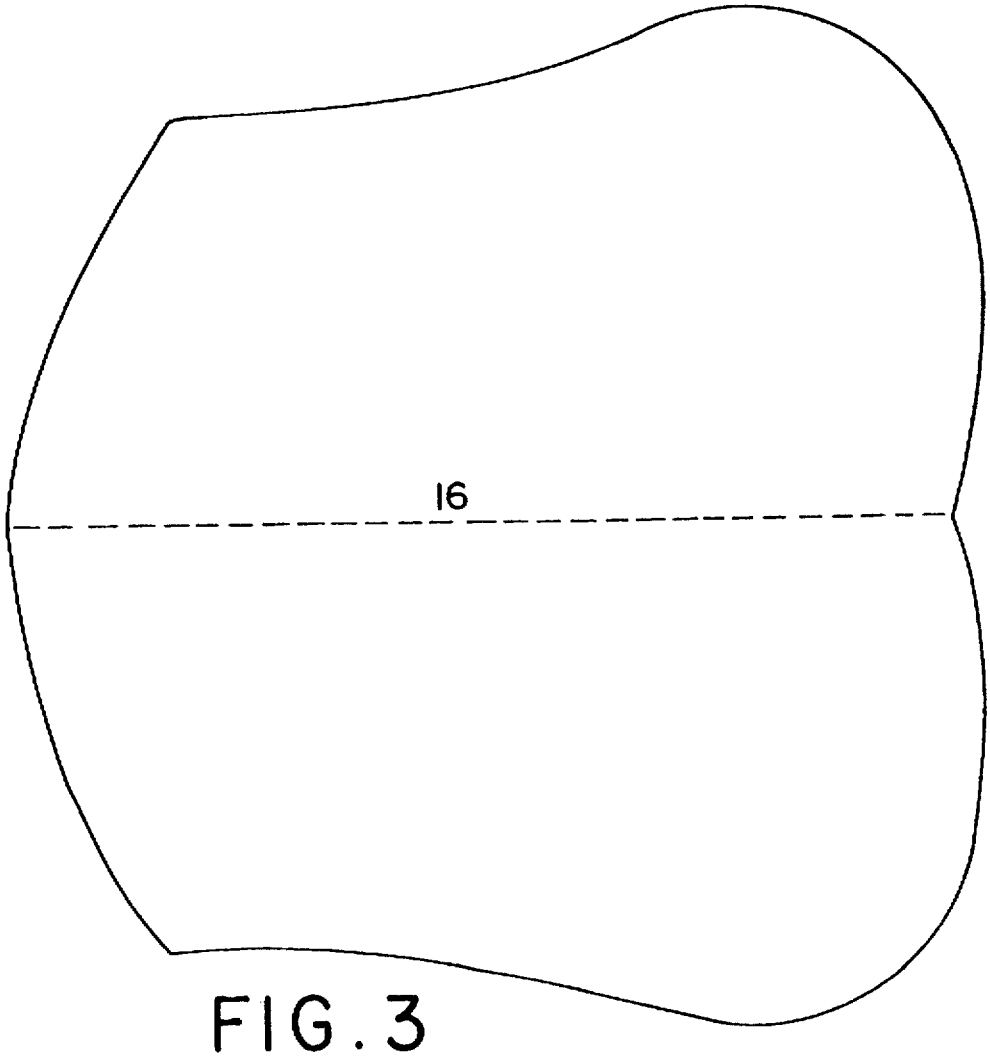
FIG. 3 is illustrates the shape to which the cover of FIG. 1 is cut prior to it being sewn.

The cover is assembled by cutting a piece of material into the general shape shown in FIG. 3, folding along a first edge 16 and stitching along a second edge 18 and the closed end 12. Preferably, the first edge 16, along which the cover is folded, will comprise a substantially straight edge. The opposing second edge 18, which is stitched, will have a contour characterized substantially as shown in FIG. 3.

More specifically, the contour of the stitched edge will have a downwardly concave portion 18a, a point of inflection 18b, and a upwardly concave surface 18c at the closed end thereof.

According to a novel aspect of the present invention, the golf club cover is preferably made of an elastic rubber such a neoprene.

In order to use the cover, the user merely slips the cover over the head of the club so that the club head is inserted into the opening 14. Due to the physical characteristics of the neoprene, the size of the cover, and the shape and contour of the cover, the cover fits snugly over the club to ensure that the cover remains on the club until the user desires to remove it. Moreover, due to this combination of features, no separate fastening means is required which simplifies the use of the cover and minimizes the complexity thereof. Moreover, a watertight cover is provided since the elasticity of the material obviates the need for grooves such as those used in the prior art plastic covers.

In the prior art, especially with the plastic iron covers, a different sized cover must be used for each club. In most golf club sets there are approximately eight or nine different irons, each having a slightly different sized club head. Obviously, it is highly desirable to have one cover that can securely fit any of the clubs. Therefore, according to another novel feature of the present invention, since the neoprene can be easily stretched to securely cover different sized club heads, a set of covers, all of the same size, can be used to cover a set of different sized irons. This simplifies the manufacture process for the covers.

To this end, one embodiment of the invention comprises a set of golf club covers that are all of the same size so that each of the covers can securely fit any of the irons of a set of golf club irons. This novel feature of the invention is possible due the choice of material, i.e. neoprene, and is not believed to be heretofore known.

While neoprene is the preferred material for implementing the present invention, similar types of material can also be used. In general, however, it is desired not to use plastics, leather or nylon. Neoprene and materials with similar elasticity are preferred.

Preferably, the size of the opening 14 is smaller than the size of the smallest club head of a set or irons. For example, the width of the opening W may be 2–2½" or less and the length L may be 4¾–5" or less. Preferably, the length L1 at the point of inflection 18b is approximately 2½–2¾".

While the preferred shape of the cover is as shown in FIG. 1, various alternatives exist. In general, it is desirable to have a contoured shape to enable the cover to fit snugly around the club head without the need for fastening means. While the first edge is preferably straight, it may be contoured, with either the same or a different shape than the second edge.

The foregoing is a description of the preferred embodiments of the present invention. Various modifications and improvements will be readily apparent to one of ordinary skill in the art. The invention is not limited to the preferred embodiments, and is only limited by the claims appended hereto.

I claim:

1. A cover for the head of the golf club iron, comprising elastic rubber material shaped in the form of an elongated casing and defining an opening, said opening having a width less than the maximum width of the golf club iron head to be covered, wherein said cover comprises a piece of neoprene material folded along a first edge and stitched along a second edge opposing said first edge and further comprising a closed end between said first edge and said second edge, wherein said closed end is also stitched, said casing including means for allowing said cover to fit snugly over said golf club iron head along its entire length.

2. The cover of claim 1, wherein said cover is substantially free of any fastening means.

3. The cover of claim 1, wherein said casing securely covers and provides a watertight protective cover for said golf club iron head.

4. A set of golf club covers comprising a plurality of covers for covering the heads of a set of golf club irons, wherein each of said plurality of covers comprises an elongated casing of elastic rubber material having an opening through which said head may be inserted, said opening having a width less than the maximum width of the golf club iron head to be covered, and each of said plurality of golf club covers of said set is of substantially the same size, wherein each said cover comprises a piece of neoprene material folded along a first edge and stitched along a second edge opposing said first edge and further comprising a closed end between said first edge and said second edge wherein said closed end is also stitched, said casing including means for allowing said cover to fit snugly over said golf club iron head along its entire length.

5. The golf club covers of claim 4, wherein said covers are substantially free of any fastening means.

6. The golf club covers of claim 4, wherein said casing securely covers and provides a watertight protective cover for said golf club iron head.

7. A cover for the head of the golf club iron, comprising elastic rubber material shaped in the form of an elongated casing and defining an opening, said opening have a width less than the maximum width of the golf club iron head to be covered, wherein said cover has a closed end opposed to said opening, a substantially straight first edge, located between said opening and said closed end, along which said material is folded and an opposing second edge having a contour characterized by a downwardly concave section extending to a point of inflection and a upwardly concave section extending to said closed end.

8. The cover of claim 7, wherein said material is neoprene.

9. The cover of claim 7, wherein said cover is substantially free of any fastening means.

10. A cover for the head of a golf club, comprising an elongated casing formed of an elastic rubber material for fitting over the head of a golf club, said casing comprising a first edge extending along a first portion of a golf club head and including an opening having a top, a bottom, and a width less than the maximum width of said golf club head to be covered, said first edge having a contour characterized by a downwardly concave section extending from the bottom of said opening to a point of inflection and an upwardly concave section extending from said point of inflection to a second edge, said second edge extending along a second portion of said golf club head and extending from said first edge to the top of said opening.

11. The cover of claim 10, wherein said material is neoprene.

12. The cover of claim 10, wherein said cover is substantially free of any fastening means.

13. The cover of claim 10, wherein said casing comprises a single piece of material folded along said second edge along a portion of said second edge adjacent to the top of said opening.

*14. A cover for the head of a golf club iron comprising:*

*a neoprene elongated casing defining an opening, said opening having a width less than the maximum width of a golf club iron head to be covered;*

*said casing comprising:*

*a first edge,*

*a second edge opposing said first edge,*

*a closed end between said first edge and said second edge, said casing being stitched along said second edge and said closed end; and*

*means for allowing said casing to fit snugly over said golf club iron head along its entire length.*

*15. A cover for the head of a golf club iron comprising:*

*an elongated casing formed of an elastic rubber material for fitting over the head of a golf club iron;*

*said casing comprising a first edge portion, a second edge portion, and an opening having a first side, a second side, and a size less than the maximum width of said golf club iron head to be covered;*

*the first edge portion and second edge portion defining a closed end of the casing; and*

*the first edge portion having a first contour and the second edge portion having a second contour such that the casing has a contoured shape to enable the cover the fit snugly around the head of a golf club iron head without the need for fastening means.*

* * * * *